US012224134B2

(12) United States Patent
Fukushima

(10) Patent No.: US 12,224,134 B2
(45) Date of Patent: Feb. 11, 2025

(54) ROTARY ELECTRIC COMPONENT

(71) Applicant: Tokyo Cosmos Electric Co., Ltd., Zama (JP)

(72) Inventor: Hajime Fukushima, Kanagawa (JP)

(73) Assignee: Tokyo Cosmos Electric Co., Ltd., Zama (JP)

( * ) Notice: Subject to any disclaimer, the term of this patent is extended or adjusted under 35 U.S.C. 154(b) by 121 days.

(21) Appl. No.: 18/019,268

(22) PCT Filed: May 26, 2021

(86) PCT No.: PCT/JP2021/019979

§ 371 (c)(1),
(2) Date: Feb. 2, 2023

(87) PCT Pub. No.: WO2022/030078

PCT Pub. Date: Feb. 10, 2022

(65) Prior Publication Data

US 2023/0290586 A1 Sep. 14, 2023

(30) Foreign Application Priority Data

Aug. 5, 2020 (JP) ................................ 2020-132997

(51) Int. Cl.
*H01H 19/14* (2006.01)
*H01H 19/11* (2006.01)

(52) U.S. Cl.
CPC ............ *H01H 19/14* (2013.01); *H01H 19/11* (2013.01)

(58) Field of Classification Search
CPC ...... H01H 19/14; H01H 19/11; H01H 1/2041; H01H 19/62; H01H 19/56; H01H 19/58;
(Continued)

(56) References Cited

U.S. PATENT DOCUMENTS

| | | | |
|---|---|---|---|
| 4,296,292 A | 10/1981 | Schuberth et al. | |
| 2012/0000758 A1 | 1/2012 | Fukushima et al. | |

FOREIGN PATENT DOCUMENTS

| | | |
|---|---|---|
| DE | 3916274 | 11/1989 |
| JP | 55-096610 | 11/1954 |

(Continued)

OTHER PUBLICATIONS

International Search Report and the Written Opinion Dated Jul. 27, 2021 From the International Searching Authority Re. Application No. PCT/JP2021/019979 and its Translation of the Search Report into English. (9 Pages).

*Primary Examiner* — Anthony R Jimenez

(57) ABSTRACT

Provided is a rotary electric component in which the operation sensation is maintained over a long period. This rotary electric component comprises an operation part that is rotationally operated, a housing part that has an accommodation part with a corrugated part formed on a peripheral wall surface of the accommodation part; a rotary body that is accommodated in the accommodation part and connected to the operation part, and that is positioned so as to rotate along the peripheral wall surface in response to the rotation of the operation part; an impelling part that impels toward the peripheral wall surface; and a rotary piece that is positioned in the rotary body so as to be impelled by the impelling part and to abut the peripheral wall surface, rotates according to the rotation of the rotary body while moving along the peripheral wall surface, and has a recessed part that is for holding a lubricant and is formed in a facing surface facing the peripheral wall surface.

1 Claim, 3 Drawing Sheets

(58) Field of Classification Search
CPC ........ H01H 2015/16; H01H 3/50; G05G 1/08; G05G 1/085; G05G 23/02
USPC .......................................................... 200/565
See application file for complete search history.

(56) References Cited

FOREIGN PATENT DOCUMENTS

| | | |
|---|---|---|
| JP | 4755718 | 6/2011 |
| JP | 2011-159562 | 8/2011 |

ROTARY ELECTRIC COMPONENT

TECHNICAL FIELD

The present disclosure relates to a rotary electric component.

BACKGROUND ART

Conventionally, rotary electric components such as a rotary switch, whose contact point is switched between a plurality of contact points by turning an operation part, have been put to practical use. Such rotary electric components are used, for example, for switching power, adjusting volume, and changing channels. Rotary electric components are required to provide improved feeling while in operation (also referred to as "operational feeling") according to the operation of the operation part.

As a technique for improving the operational feeling, for example, Patent Literature (hereinafter, referred to as PTL) 1 proposes a click mechanism for electric components that can provide satisfactory and clear click feeling. In this mechanism, a clicking piece biased by a spring elastically contacts the irregularities formed on the peripheral wall surface of the housing, thereby improving the operational feeling.

CITATION LIST

Patent Literature

PTL 1
Japanese Patent No. 4755718

SUMMARY OF INVENTION

Technical Problem

In the mechanism of PTL 1, preventing the decrease of a lubricant applied to the clicking piece is required for maintaining the operational feeling over a long period of time.

An object of the present disclosure is to provide a rotary electric component capable of maintaining the operational feeling over a long period of time.

Solution to Problem

A rotary electric component according to the present disclosure includes: an operation part that is operated to perform a rotation; a housing part including an accommodating part that includes a peripheral wall surface, the peripheral wall surface including an irregular part formed thereon; a rotating body housed in the housing part and connected to the operation part, the rotating body being disposed so as to rotate along the peripheral wall surface in accordance with the rotation of the operation part; a biasing part that performs biasing toward the peripheral wall surface; and a rotating piece disposed at the rotating body so as to be brought into contact with the peripheral wall surface by the biasing of the biasing part, wherein the rotating piece rotates while moving along the peripheral wall surface according to the rotation of the rotating body, and the rotating piece includes a recess for holding a lubricant and a facing surface facing the peripheral wall surface, the recess being formed in the facing surface.

Advantageous Effects of Invention

The present disclosure can maintain the operational feeling over a long period of time.

DESCRIPTION OF EMBODIMENTS

Hereinafter, embodiments according to the present disclosure will be described based on the accompanying drawings.

Embodiment 1

Figure 1:
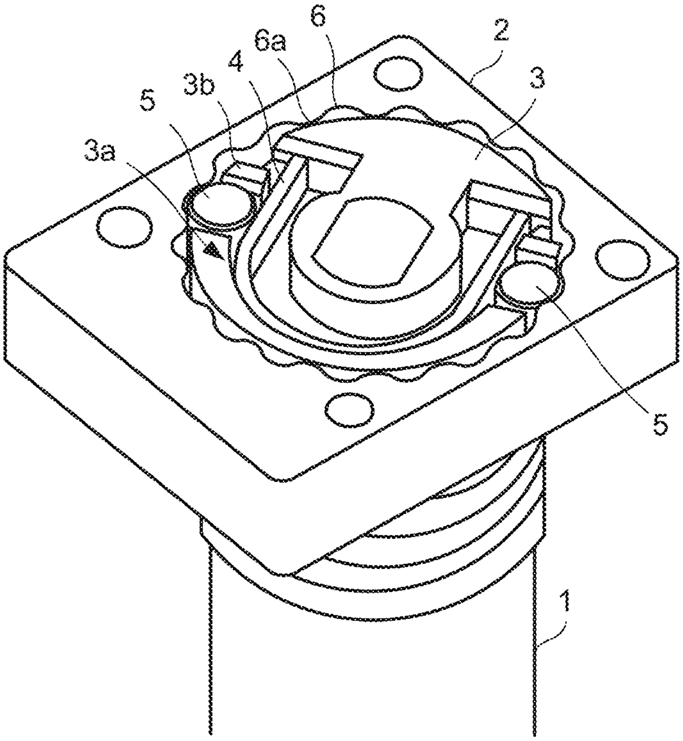
FIG. 1 illustrates the configuration of a rotary electric component of Embodiment 1 of the present disclosure.

FIG. 1 illustrates the configuration of a rotary electric component of Embodiment 1 of the present disclosure. The rotary electric component includes operation part 1, housing part 2, rotating body 3, biasing part 4, and two rotating pieces 5.

Operation part 1 is operated by an operator to be rotated. Operation part 1 is formed to extend axially and is disposed to be rotatable about its own central axis.

Housing part 2 includes accommodating part 6 for housing rotating body 3. Accommodating part 6 is formed so as to surround the outer peripheral portion of rotating body 3 in the circumferential direction of the rotating body. Irregular part 6*a*, with its irregularities formed continuously at the same intervals, is disposed in the circumferential direction on the peripheral wall surface of accommodating part 6—the peripheral wall surface faces rotating body 3. Irregular part 6*a* is formed so as to be curved corresponding to the outer peripheral surface of rotating piece 5.

Rotating body 3 is formed in a disk shape and housed in accommodating part 6 of housing part 2. In addition, rotating body 3 is connected at its center to one end of operation part 1 disposed to extend toward accommodating part 6. Rotating body 3 is thus disposed in accommodating part 6 so as to rotate along the peripheral wall surface of accommodating part 6 according to the rotation of operation part 1.

Rotating body 3 includes holding part 3*a* for holding biasing part 4 and supporting part 3*b* for supporting rotating pieces 5. Holding part 3*a* is formed to hold biasing part 4 from the outside. Supporting part 3*b* is disposed with rotating pieces 5 located between its portions in the rotation direction of rotating body 3. The supporting parts restrict each rotating piece 5 from moving in the rotation direction of rotating body 3 from a support position defined by support parts 3*b*. The supporting parts also supports each rotating piece 5 in such a way that the rotating piece is movable in the radial direction of rotating body 3.

Biasing part 4 is disposed with rotating pieces 5 located between the biasing part and the peripheral wall surface of accommodating part 6, and is formed so as to bias rotating pieces 5 toward the peripheral wall surface of accommodating part 6. Biasing part 4 may include a U-shaped leaf spring.

Two rotating pieces 5 are disposed at rotating body 3 so as to face each other with the rotation axis of rotating body 3 located therebetween, and are biased by biasing part 4 so as to contact the peripheral wall surface of accommodating part 6. Rotating piece 5 is formed so as to contact the peripheral wall surface of accommodating part 6 and rotate about its own rotation axis while moving along the peripheral wall surface of accommodating part 6, in accordance with the rotation of rotating body 3. A lubricant is applied to the surface of rotating piece 5 so that rotating piece 5 can move and rotate smoothly.

Figure 2:
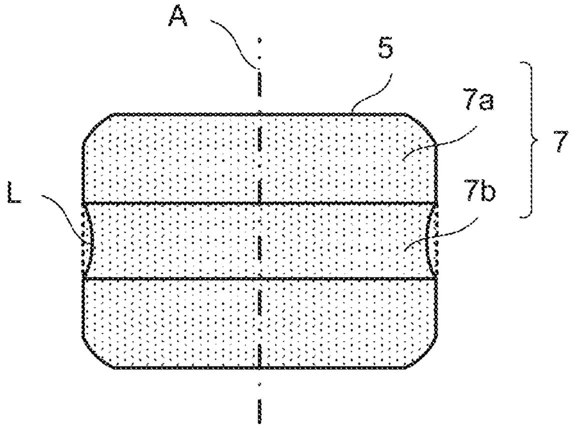
FIG. 2 illustrates the configuration of a rotating piece.

FIG. 2 illustrates the configuration of rotating piece 5 in detail.

Rotating piece 5 has a columnar shape and includes peripheral surface 7 facing the peripheral wall surface of accommodating part 6. Contact part 7*a* and recess 7*b* are formed at outer peripheral surface 7. Outer peripheral surface 7 corresponds to the facing surface in the present invention.

Recess 7*b* is configured to hold lubricant L and is formed to extend along outer peripheral surface 7. Specifically, recess 7*b* is formed in the central portion of rotating piece 5 in the height direction, in which rotation axis A of rotating piece 5 extends, in such a way that the recess extends over the entire circumference and parallel to the rotation direction of rotating piece 5. Lubricant L is applied to fill the inside of recess 7*b*.

Contact part 7*a* contacts the peripheral wall surface of accommodating part 6, and is disposed with recess 7*b* located inside in the height direction, in which rotation axis A extends. Lubricant L is applied to the surface of contact part 7*a*.

Rotating piece 5 is preferably formed so as to be impregnated with lubricant L. For example, rotating piece 5 can be impregnated with lubricant L by subjecting rotating piece 5 to impregnation with lubricant L.

Lubricant L may include grease.

In the following, the operation of the present embodiment will be described.

Operation part 1 illustrated in FIG. 1 is rotated by the operation of an operator, and rotating body 3 housed in accommodating part 6 is rotated along the peripheral wall surface of accommodating part 6 according to the rotation of the operation part. The disposition of rotating piece 5 at rotating body 3 is such that the rotating piece is biased by biasing part 4 to contact the peripheral wall surface of accommodating part 6. As a result, rotating piece contacts the peripheral wall surface of accommodating part 6 and rotates about its own rotation axis A while moving along the peripheral wall surface of accommodating part 6, in accordance with the rotation of rotating body 3. The operator can thus rotationally operate operation part 1 with an appropriate click feeling.

In addition, rotating piece 5 moves in accordance with the rotation of rotating body 3 while getting over the irregularities of irregular part 6*a* formed on the peripheral wall surface of accommodating part 6. The operator thus can obtain an appropriate click feeling as operation part 1 is operated.

As rotating piece 5 has a columnar shape with its outer peripheral surface 7 facing the peripheral wall surface of accommodating part 6, the rotating piece can be brought into contact with the peripheral wall surface of accommodating part 6 over a wide area as compared with, for example, forming the rotating piece in a spherical shape. This configuration can further improve the operational feeling of the operator.

Typically, lubricant L is applied to the surface of a rotating piece. When the rotating piece is formed without forming recess 7*b*, so that the outer peripheral surface thereof uniformly contacts the peripheral wall surface of accommodating part 6, lubricant L applied to the rotating piece is removed in a short period of time due to contact with the peripheral wall surface of accommodating part 6. This may eventually prevent smooth movement and rotation of the rotating piece.

In the present embodiment, rotating piece 5 includes recess 7*b*, for holding lubricant L, formed in outer peripheral surface 7 facing the peripheral wall surface of accommodating part 6, as illustrated in FIG. 2. Such rotating piece 5 allows the presence of lubricant L between contact part 7*a* and the peripheral wall surface of accommodating part 6 while a certain amount of lubricant L applied to contact part 7*a* remains; thus the rotating piece can be smoothly moved and rotated.

Figure 3:
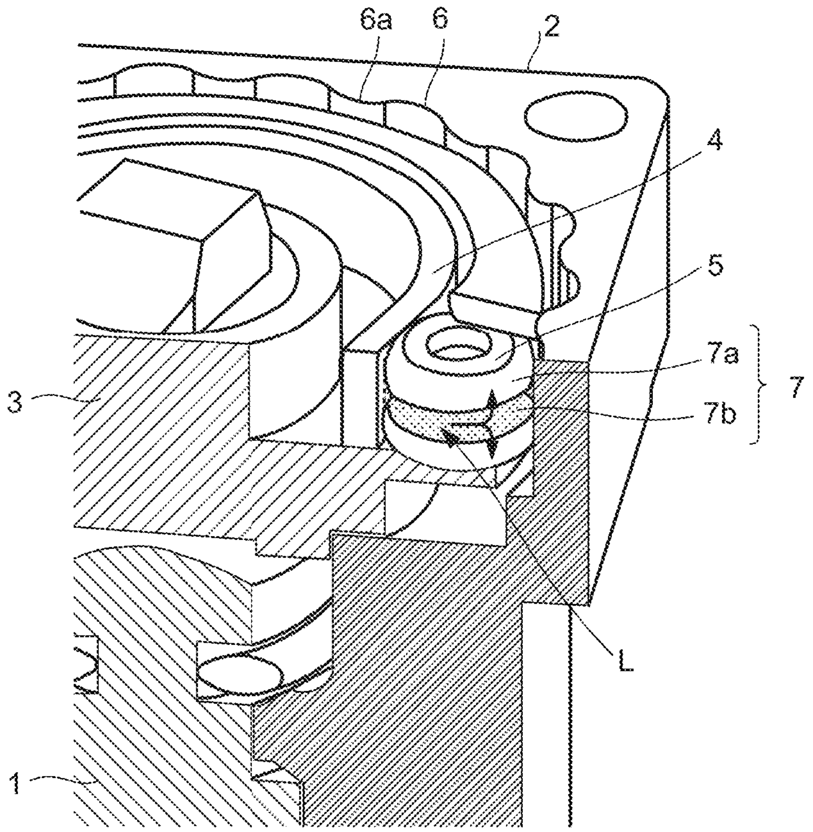
FIG. 3 illustrates how a lubricant moves from a recess to a contact part.

As illustrated in FIG. 3, as the amount of lubricant L applied to contact part 7*a* is reduced due to contact with the peripheral wall surface of accommodating part 6, lubricant L held in recess 7*b* sequentially moves to contact part 7*a* according to the movement and rotation of rotating piece 5. This configuration allows a certain amount of lubricant L to continuously remain on the surface of contact part 7*a*. Therefore, rotating piece 5 can be smoothly moved and rotated over a long period of time, and the click feeling of operation part 1 can be maintained over a long period of time.

As recess 7*b* is formed adjacent to contact part 7*a*, lubricant L can be smoothly moved to contact part 7*a*. Recess 7*b* is preferably formed in such a way that its depth becomes smaller toward contact part 7*a* from the central portion in the height direction, in which rotation axis A extends. This configuration allows lubricant L held in recess 7*b* to move to contact part 7*a* more smoothly.

In addition, as recess 7*b* is formed so as to extend along outer peripheral surface 7 of rotating piece 5, lubricant L can be uniformly supplied to contact part 7*a* according to the rotation of rotating piece 5.

Further, as recess 7*b* is formed so as to extend parallel to the rotation direction of rotating piece 5, lubricant L can be supplied to contact part 7*a* without hindering the rotation of rotating piece 5.

As contact part 7*a* is disposed at both ends of rotating piece 5 in the height direction, in which rotation axis A extends, the pressing force against the peripheral wall surface of accommodating part 6 can be maintained even when formed recess 7*b* is large. Therefore, rotating piece 5 can be stably moved and rotated.

More advantageously, abrasion powder generated in accommodating part 6, for example, abrasion powder generated when rotating piece 5 moves while contacting irregular part 6*a*, can be housed in recess 7*b* as rotating piece 5 moves. Abrasion powder thus can be removed from the space between contact part 7*a* and the peripheral wall surface of accommodating part 6.

In this manner, rotating operation part 1 can, for example, sequentially switch between a plurality of contact points (not illustrated). Such a rotary electric component can be used, for example, in variable resistors and encoders. Using such a rotary electric component can perform operations such as power switching, volume adjustment, and channel change.

In the present embodiment, rotating piece 5 includes recess 7*b* (for holding lubricant L) formed in outer peripheral surface 7 facing the peripheral wall surface of accommodating part 6. Therefore, as the amount of lubricant L applied to contact part 7*a* decreases, lubricant L held in recess 7*b* is moved to contact part 7*a*. In addition, abrasion powder generated in accommodating part 6 can be removed by sequentially housing the abrasion powder into recess 7*b*. As a result, the operational feeling of operation part 1 can be maintained over a long period of time.

Embodiment 2

In the following, Embodiment 2 of the present disclosure will be described. Here, differences from Embodiment 1 will be mainly described, and same reference numerals will be used for parts the same as in Embodiment 1, and detailed description thereof will be omitted.

In Embodiment 1, recess 7*b* is formed so as to extend parallel to the rotation direction of rotating piece 5; however, the configuration of the present invention is not limited thereto as long as the recess is formed in the facing surface facing the peripheral wall surface of accommodating part 6.

Figure 4:
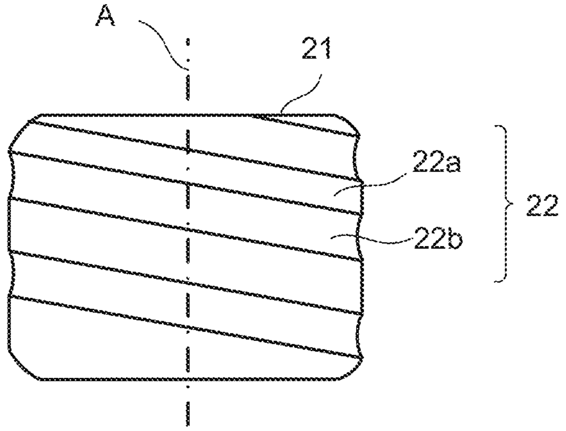
FIG. 4 illustrates the configuration of a rotating piece of Embodiment 2.

For example, as illustrated in FIG. 4, rotating piece 21 may be disposed in place of rotating piece 5 of Embodiment 1. In FIG. 4, lubricant L is omitted.

Rotating piece 21 is disposed so as to rotate about its own rotation axis A. Contact part 22*a* and recess 22*b* are formed at outer peripheral surface 22 of the rotating piece. Outer peripheral surface 22 corresponds to the facing surface in the present invention.

Recess 22*b* is configured to hold lubricant L and is formed to extend along outer peripheral surface 22. Specifically, recess 22*b* is formed to extend obliquely with respect to the rotation direction of rotating piece 21. That is, recess 22*b* is formed so as to extend spirally by winding outer peripheral surface 22 a plurality of times. In addition, recess 22*b* is formed in such a way that both ends thereof respectively reach both surfaces of rotating piece 21—the surfaces face each other in the direction in which rotation axis A extends. Lubricant L is applied to fill the inside of recess 22*b*.

Contact part 22*a* contacts the peripheral wall surface of accommodating part 6, and is formed to extend spirally with a portion thereof located between portions of recess 22*b*. Lubricant L is applied to the surface of contact part 22*a*.

This configuration allows sequential moving of lubricant L held in recess 22*b* to contact part 22*a* according to the movement and rotation of rotating piece 21 when the amount of lubricant L applied to contact part 22*a* is reduced due to contact with the peripheral wall surface of accommodating part 6. This configuration allows a certain amount of lubricant L to continuously remain on the surface of contact part 22*a*, thereby maintaining the operational feeling of operation part 1 over a long period of time.

In the present embodiment, recess 22*b* is formed so as to extend obliquely with respect to the rotation direction of rotating piece 21, that is, the recess is formed so as to overlap contact part 22*a* in the rotation direction of rotating piece 21. Therefore, lubricant L held in recess 22*b* can be uniformly moved to the entire contact part 22*a* according to the rotation of rotating piece 21.

In addition, recess 22*b* is formed in such a way that both ends thereof respectively reach both surfaces of rotating piece 21 facing each other in the direction, in which rotation axis A extends. Therefore, as the amount of lubricant L held in recess 22*b* decreases, lubricant L applied to both surfaces of rotating piece 21 can be moved into recess 22*b* from both ends of recess 22*b*, thereby holding lubricant L in recess 22*b* for a long period of time.

More advantageously, abrasion powder generated in accommodating part 6, for example, abrasion powder generated when rotating piece 21 moves while contacting irregular part 6*a*, can be housed in recess 22*b* as rotating piece 21 moves. Abrasion powder thus can be removed from the space between contact part 22*a* and the peripheral wall surface of accommodating part 6.

In the present embodiment, rotating piece 21 includes recess 22*b* formed so as to extend obliquely with respect to the rotation direction thus can uniformly move lubricant L held in recess 22*b* to the entire contact part 22*a* according to the rotation of rotating piece 21. In addition, abrasion powder generated in accommodating part 6 can be removed by sequentially housing the abrasion powder into recess 22*b*. As a result, the operational feeling of operation part 1 can be improved.

Embodiment 3

In the following, Embodiment 3 of the present disclosure will be described. Here, differences from Embodiments 1 and 2 will be mainly described, and same reference numerals will be used for parts the same as in Embodiments 1 and 2, and detailed description thereof will be omitted.

In Embodiments 1 and 2, one recess extending along its outer peripheral surface is formed in the rotating piece; however, a plurality of recesses may also be formed.

Figure 5:
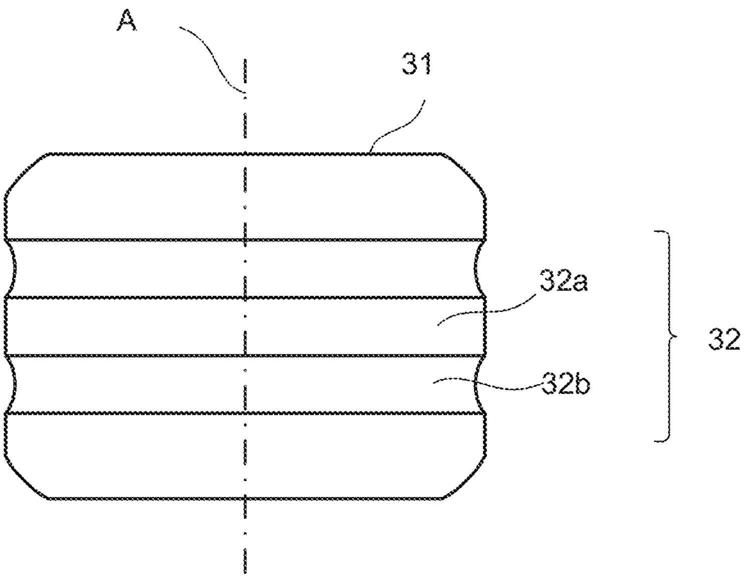
FIG. 5 illustrates the configuration of a rotating piece of Embodiment 3.

For example, as illustrated in FIG. 5, rotating piece 31 may be disposed in place of rotating piece 5 of Embodiment 1. In FIG. 5, lubricant L is omitted.

Rotating piece 31 is disposed so as to rotate about its own rotation axis A. Contact part 32*a* and two recesses 32*b* are formed at outer peripheral surface 32 of the rotating piece. Outer peripheral surface 32 corresponds to the facing surface in the present invention.

Two recesses 32*b* are configured to hold lubricant L and each is formed to extend along outer peripheral surface 32. Specifically, two recesses 32*b* are disposed with the central portion of rotating piece 31 (in the height direction, in which rotation axis A of rotating piece 31 extends) located therebetween. Each recess is formed in such a way that the recess extends over the entire circumference and parallel to the rotation direction of rotating piece 31. Lubricant L is applied to fill the inside of recess 32*b*.

Contact part 32*a* contacts the peripheral wall surface of accommodating part 6, and is disposed in such a way that each recess 32*b* is located between portions of the contact part. Lubricant L is applied to the surface of contact part 32*a*.

This configuration allows sequential moving of lubricant L held in recess 32*b* to contact part 32*a* according to the movement and rotation of rotating piece 31 when the amount of lubricant L applied to contact part 32*a* is reduced due to contact with the peripheral wall surface of accommodating part 6. This configuration allows a certain amount of lubricant L to continuously remain on the surface of contact part 32*a*, thereby maintaining the operational feeling of operation part 1 over a long period of time.

In the present embodiment, two recesses 32*b* are formed in rotating piece 31. Lubricant L thus can be rapidly supplied from recesses 32*b* to adjacent contact part 32*a*, and the amount of lubricant L applied on contact part 32*a* can be maintained.

In addition, two recess 32*b* are each formed so as to extend parallel to the rotation direction of rotating piece 31.

Therefore, recesses 32_b_ can supply lubricant L to contact part 32_a_ without hindering the rotation of rotating piece 31.

More advantageously, abrasion powder generated in accommodating part 6, for example, abrasion powder generated when rotating piece 31 moves while contacting irregular part 6_a_, can be housed in recess 32_b_ as rotating piece 31 moves. Abrasion powder thus can be removed from the space between contact part 32_a_ and the peripheral wall surface of accommodating part 6.

In the present embodiment, rotating piece 31 includes two recesses 32B formed therein thus can rapidly supply lubricant L from recesses 32_b_ to adjacent contact part 32_a_. Therefore, the amount of lubricant L applied on contact part 32_a_ can be maintained. In addition, abrasion powder generated in accommodating part 6 can be removed by sequentially housing the abrasion powder into recess 32_b_.

Embodiment 4

In the following, Embodiment 4 of the present disclosure will be described. Here, differences from Embodiments 1 to 3 will be mainly described, and same reference numerals will be used for parts the same as in Embodiments 1 to 3, and detailed description thereof will be omitted.

In Embodiments 1 to 3, the recess of a rotating piece is formed so as to extend along the outer peripheral surface; however, the configuration of the present invention is not limited thereto as long as the recess is formed in a facing surface facing the peripheral wall surface of accommodating part 6.

Figure 6:
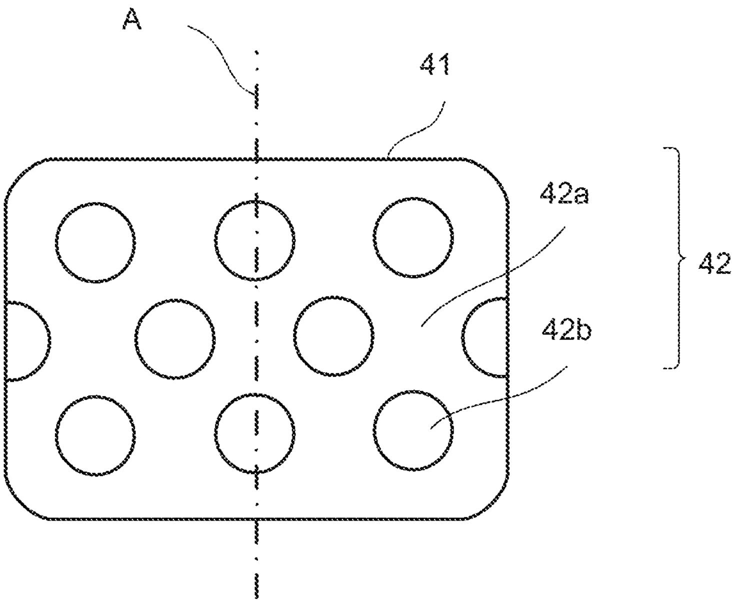
FIG. 6 illustrates the configuration of a rotating piece of Embodiment 4.

For example, as illustrated in FIG. 6, rotating piece 41 may be disposed in place of rotating piece 5 of Embodiment 1. In FIG. 6, lubricant L is omitted.

Rotating piece 41 is disposed so as to rotate about its own rotation axis A. Contact part 42_a_ and a plurality of recesses 42_b_ are formed at outer peripheral surface 42 of the rotating piece. Outer peripheral surface 42 corresponds to the facing surface in the present invention.

Recesses 42_b_ are configured to hold lubricant L and are formed so as to be dispersed over the entire outer peripheral surface 42. Lubricant L is applied to fill the insides of recesses 42_b_.

Contact part 42_a_ contacts the peripheral wall surface of accommodating part 6. Lubricant L is applied to the surface of contact part 42_a_.

In this manner, the plurality of recesses 42_b_ are formed so as to be distributed over the entire outer peripheral surface 42 of rotating piece 41; therefore, lubricant L can be uniformly supplied from recesses 42_b_ to the entire contact part 42_a_. The operational feeling of operation part 1 thus can be improved.

More advantageously, abrasion powder generated in accommodating part 6, for example, abrasion powder generated when rotating piece 41 moves while contacting irregular part 6_a_, can be housed in recesses 42_b_ as rotating piece 41 moves. Abrasion powder thus can be removed from the space between contact part 42_a_ and the peripheral wall surface of accommodating part 6.

In the present embodiment, rotating piece 41 includes a plurality of recesses 42_b_ formed therein so as to be distributed over the entire outer peripheral surface 42 thus can uniformly supply lubricant L from recesses 42_b_ to the entire contact part 42_a_. The operational feeling of operation part 1 thus can be improved.

In Embodiments 1 to 4, the rotating piece is formed to have a columnar shape with its outer peripheral surface facing the peripheral wall surface of accommodating part 6; however, the shape is not limited to columnar as long as the rotating piece is formed so as to rotate while moving along the peripheral wall surface of accommodating part 6 in accordance with the rotation of rotating body 3.

In Embodiments 1 to 4, two rotating pieces are disposed at rotating body 3; however, the number of the rotating pieces is not limited to two as long as at least one rotating piece is disposed at rotating body 3 so as to be biased by biasing part 4 to contact the peripheral wall surface of accommodating part 6.

In Embodiments 1 to 4, each of the two rotating pieces includes a recess formed therein for holding lubricant L; however, the configuration of the present invention is not limited thereto as long as at least one rotating piece includes a recess formed therein.

The embodiments above are no more than specific examples in carrying out the present invention, and the technical scope of the present invention is not to be construed in a limitative sense due to the specific examples. That is, the present invention can be carried out in various forms without departing from the spirit and the main features thereof. For example, the disclosure of the shape, number, and the like regarding each part described in the above embodiments is merely an example, and can be implemented with appropriate modifications.

This application is entitled to and claims the benefit of Japanese Patent Application No. 2020-132997 filed on Aug. 5, 2020, the disclosure of which including the specification, drawings and abstract is incorporated herein by reference in its entirety.

INDUSTRIAL APPLICABILITY

The rotary electric component of the present disclosure can be used as an electric component in which a rotating piece rotates while moving along the peripheral wall surface of an accommodating part in accordance with the rotation of the rotating body.

REFERENCE SIGNS LIST

1 Operation part
2 Housing part
3 Rotating body
3_a_ Holding part
3_b_ Supporting part
4 Biasing part
5, 21, 31, 41 Rotating piece
6 Accommodating part
6_a_ Irregular part
7, 22, 32, 42 Outer peripheral surface
7_a_, 22_a_, 32_a_, 42_a_ Contact part
7_b_, 22_b_, 32_b_, 42_b_ Recess
A Rotation axis
L Lubricant

The invention claimed is:

1. A rotary electric component comprising:

an operation part that is operated to perform a rotation;

a housing part including an accommodating part that includes a peripheral wall surface, the peripheral wall surface including an irregular part formed thereon;

a rotating body housed in the housing part and connected to the operation part, the rotating body being disposed so as to rotate along the peripheral wall surface in accordance with the rotation of the operation part;

a biasing part that performs biasing toward the peripheral wall surface; and a rotating piece disposed at the rotating body so as to be brought into contact with the peripheral wall surface by the biasing of the biasing part, wherein the rotating piece rotates while moving along the peripheral wall surface according to the rotation of the rotating body, and the rotating piece includes a recess and a facing surface facing the peripheral wall surface, the recess being for holding a lubricant and formed in the facing surface wherein the rotating piece has a columnar shape with an outer peripheral surface facing the peripheral wall surface, and wherein the recess of the rotating piece is formed in the outer peripheral surface so as to extend obliquely with respect to a rotation direction of the rotating piece.

* * * * *